United States Patent
Huang

(10) Patent No.: US 12,307,623 B1
(45) Date of Patent: May 20, 2025

(54) METHOD AND DEVICE FOR PRECISELY OBTAINING FAN-SHAPED IMAGE FRAME OF PAPER CUP

(71) Applicant: Shenzhen Saiwai Technology Co., Ltd., Guangdong (CN)

(72) Inventor: Ming Huang, Guangdong (CN)

(73) Assignee: Shenzhen Saiwai Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/896,726

(22) Filed: Sep. 25, 2024

(30) Foreign Application Priority Data

Jun. 26, 2024 (CN) .......................... 202410836783.0

(51) Int. Cl.
G06T 7/00 (2017.01)
G06T 3/067 (2024.01)
G06T 3/40 (2006.01)
G06T 7/11 (2017.01)

(52) U.S. Cl.
CPC ................ G06T 3/067 (2024.01); G06T 3/40 (2013.01); G06T 7/11 (2017.01); G06T 2207/20036 (2013.01)

(58) Field of Classification Search
CPC ......... G06T 15/205; G06T 2207/20081; G06T 2207/20084; G06T 7/001; G06T 7/12; G06T 7/73; G06V 10/82; G06V 2201/06
See application file for complete search history.

(56) References Cited

U.S. PATENT DOCUMENTS

2020/0311956 A1* 10/2020 Choi .................... G06V 10/454
2023/0385466 A1* 11/2023 Harvill .................... G06F 30/12

OTHER PUBLICATIONS

Deng, Lawrence Y., and Dong-Liang Lee. "Beverage cup analysis and material detection." 2017 International Conference on Applied System Innovation (ICASI). IEEE, 2017.*
Aydn, Alaaddin, and Selda Güney. "Fault detection system for paper cup machine based on real-time image processing." Engineering Applications of Artificial Intelligence 133 (2024): 108070.*
Wang, Ping, et al. "Research and Evaluation on an Optical Automatic Detection System for the Defects of the Manufactured Paper Cups." Sensors 23.3 (2023): 1452.*

(Continued)

*Primary Examiner* — Li Liu

(57) ABSTRACT

Disclosed are a method and device for precisely obtaining a fan-shaped image frame of a paper cup. The method includes: outputting a rectangular detection box and a binary mask of a fan-shaped image; obtaining a binary fan-shaped image; determining a number of times that a side line of the rectangular detection box passes through a frame communication area of the binary fan-shaped image, and adjusting a side line position of the rectangular detection box, to obtain a minimum bounding rectangle; obtaining a rough contour of the fan-shaped image; determining a target paper cup model; importing a template image of the target paper cup model; cropping the image to be processed to obtain a processing area image; and scaling the processing area image, and performing a bitwise AND operation between the precise binary mask and the processing area image to obtain a fan-shaped image precisely segmented and its corresponding frame.

9 Claims, 5 Drawing Sheets

(56) References Cited

OTHER PUBLICATIONS

Huang, Yanzhe, Yabo Luo, and Xiangyu Zhou. "An experimental teaching platform for machine vision-based real-time detection taking quality inspection of paper cups as instance." 2023 3rd International Conference on Educational Technology (ICET). IEEE, 2023.*

* cited by examiner

METHOD AND DEVICE FOR PRECISELY OBTAINING FAN-SHAPED IMAGE FRAME OF PAPER CUP

CROSS REFERENCE TO RELATED APPLICATIONS

The present application claims the benefit of Chinese Patent Application No. 202410836783.0 filed on Jun. 26, 2024, the contents of which are incorporated herein by reference in their entirety.

TECHNICAL FIELD

The present disclosure relates to the technical field of paper cup designs, and in particular to a method and device for precisely obtaining a fan-shaped image frame of a paper cup.

BACKGROUND

With an increasing demand for flexible, small-batch and customized production, the following operations or steps based on design drawings of paper cups are usually required in a customized production process of paper cups, including a 3D effect display of the design drawings, digital printing nozzle positioning or offset printing imposition (assembly), laser die-cutting, and the like. Therefore, precisely obtaining a fan-shaped image frame of a paper cup and precisely positioning target areas for printing, die-cutting and texture sampling are prerequisites and foundations for implementing the above operations.

As artificial intelligence technology is increasingly applied in the field of paper cup production, training and fine-tuning of neural network models for the field of paper cup production become key processes for intelligent transformation of the field of paper cup production. Effects of model training and fine-tuning depend on a large amount of high-precision annotation data, such as high-precision fan-shaped bounding box (bbox) annotations and mask annotations. Manual annotation or use of general automated annotation tools is not only inefficient but also usually results in insufficient data, most importantly, imprecise annotation.

Therefore, based on low-precision data outputted by a neural network model preliminarily iterated, a fan-shaped image frame of a paper cup can be precisely matched, and precise annotation data can be automatically generated and then input into the model for subsequent iterations, which provides the model with annotation data required for automated, incremental and high-precision training, validation and testing, thereby improving sufficiency, a speed and a final precision of model training, and enhancing the model's practicality for downstream tasks.

Moreover, in a process of fully-automated pre-press inspection, some hidden, pixel-level design errors can be inspected and determined only after obtaining a precise fan-shaped image frame of a paper cup and then precisely locating specific pixels where errors may exist. For example, a yellow dashed box of a calibrated printing content area shown in FIG. 1 must be removed in actual production, but to locate the yellow dashed box, a precise fan-shaped image frame of a paper cup must be obtained first.

However, a method for obtaining a fan-shaped image frame from a design drawing in the prior art have the following shortcomings:
(1) since neural network output results are directly affected by quality and quantity of training data and annotation data, the method of fitting edges of a segmentation mask directly outputted by a deep neural network is imprecise in obtaining a fan-shaped image frame of a paper cup; and
(2) with conventional image processing means, the method is used to obtain a fan-shaped image frame of a paper cup according to geometric features of components of the fan-shaped image frame of a paper cup (such as straight lines, arcs and other features), and information of template matching and feature point matching, and has the following disadvantages: susceptibility to noise interference in an image, unstable output of results, great differences in output results under different conditions, high requirements for processing of image files, and lack of general applicability.

In view of this, it is necessary to provide a method and device for precisely obtaining a fan-shaped image frame of a paper cup to overcome the above defects.

SUMMARY

An objective of the present disclosure is to provide a method and device for precisely obtaining a fan-shaped image frame of a paper cup, so as to solve the problem of a method of the prior art in obtaining an imprecise fan-shaped image frame of a paper cup. The method of the present disclosure enables to precisely determine a fan-shaped image frame and a model from an image file that features uncertain positions, complex backgrounds and severe noise interference.

To achieve the above objective, the present disclosure, in a first aspect, provides a method for precisely obtaining a fan-shaped image frame of a paper cup. The method includes the following steps:

S10: detecting an imported image to be processed through a pre-trained fan-shaped image detection model, and outputting a rectangular fan-shaped image detection box, which is denoted as fan_bbox;

S20: performing fan-shaped image segmentation of the imported image to be processed through a pre-trained fan-shaped image segmentation model, and outputting a binary mask of the fan-shaped image, which is denoted as fan_mask;

S30: binarizing the image to be processed to obtain a binary image denoted as bin_image, and segmenting the binary image bin_image according to the binary mask fan_mask to obtain a binary fan-shaped image denoted as fan_seg;

S40: determining a number of times that a side line of the rectangular detection box fan_bbox passes through a frame communication area of the binary fan-shaped image fan_seg through a preset hit_num algorithm, and adjusting a side line position of the rectangular detection box fan_bbox according to the number of times, to obtain a minimum bounding rectangle of the binary fan-shaped image fan_seg, which is denoted as min_bbox;

S50: obtaining a model list including a template image of each paper cup model, corresponding precise fan-shaped image specification data and a precise binary mask, wherein the template image is denoted as tmpl_image, and the precise binary mask is denoted as tmpl_mask;

S60: obtaining a rough contour of the fan-shaped image denoted as fan_contour, according to the binary mask fan_mask and the binary image bin_image;

S70: determining a target paper cup model corresponding to the rough contour fan_contour of the fan-shaped image through a preset algorithm, which is denoted as cup_type, where determination conditions of the preset algorithm include: when a right side line of the rough contour fan_contour of the fan-shaped image and a right side line of the target paper cup model cup_type are most approximate to a same straight line;

S80: importing a template image tmpl_image of the target paper cup model cup_type, the image to be processed, and the corresponding minimum bounding rectangle min_bbox, and cropping the image to be processed as the minimum bounding rectangle min_bbox to obtain a processing area image roi_image; and S90: scaling the processing area image roi_image to a same size as the template image tmpl_image, and performing a bitwise AND operation between the precise binary mask tmpl_mask and the processing area image roi_image to obtain a fan-shaped image precisely segmented from the image to be processed and its corresponding frame.

In a preferred embodiment, the S30 includes the following sub-steps:

S31: performing morphological operations on the binary mask fan_mask, including a closing operation and an opening operation in sequence, and obtaining dilated_mask=fan_mask after morphological dilation; and S32: performing the bitwise AND operation between the binary mask fan_mask and the binary image bin_image after the morphological operations, to obtain the segmented binary fan-shaped image fan_seg.

In a preferred embodiment, in the S40, the hit_num algorithm includes the following sub-steps:

S41: importing the rectangular detection box fan_bbox and the binary fan-shaped image fan_seg, and inputting linear equation parameters based on the side line of the rectangular detection box fan_bbox; and S42: starting from a leftmost side or a topmost part of the binary fan-shaped image fan_seg, traversing all pixel points along a path determined by the input linear equation parameters, when a pixel value of a traversed pixel point is greater than a preset pixel threshold, incrementing the number of passing through by 1, and when a pixel value of a next pixel point traversed is also greater than the pixel threshold, remaining unchanged in the recorded number of times of passing through.

In a preferred embodiment, in the S40, a left side line l_left, a right side line l_right, a top side line l_top, and a bottom side line l_bottom of the rectangular detection box fan_bbox are defined;

adjusting the left side line l_left of the rectangular detection box fan_bbox involves the following steps:

determining the number of times hit_num that the left side line l_left passes through a fan-shaped image frame of the binary fan-shaped image fan_seg through the hit_num algorithm;

when the hit_num=2, executing a loop below: a coordinate value x=x−1, and then continuing to determine the number of times hit_num that a new left side line l_left passes through the fan-shaped image frame through the hit_num algorithm; when the hit_num is 0 or the x is 0, exiting the loop;

when the hit_num=0, executing a loop below: a coordinate value x=x+1, and then continuing to determine the number of times hit_num that a new left side line l_left passes through the fan-shaped image frame through the hit_num algorithm; when the number of times that a new left side line l_left passes through the fan-shaped image frame is 1, executing x=x−1, and exiting the loop, where a latest left side line l_left after adjustment is the left side line of the minimum bounding rectangle of the fan-shaped image frame;

adjusting the right side line l_right of the rectangular detection box fan_bbox involves the following steps:

determining the number of times hit_num that the right side line l_right passes through a fan-shaped image frame of the binary fan-shaped image fan_seg through the hit_num algorithm;

when the hit_num=2, executing a loop below: a coordinate value x=x+1, and then continuing to determine the number of times hit_num that a new right side line l_right passes through the fan-shaped image frame through the hit_num algorithm; when the hit_num is 0 or the x is an image width, exiting the loop;

when the hit_num=0, executing a loop below: a coordinate value x=x−1, and then continuing to determine the number of times hit_num that a new right side line l_right passes through the fan-shaped image frame through the hit_num algorithm; when the number of times that a new right side line l_right passes through the fan-shaped image frame is 1, executing x=x+1, and exiting the loop, where a latest right side line l_right after adjustment is the right side line of the minimum bounding rectangle of the fan-shaped image frame;

adjusting the top side line l_top of the rectangular detection box fan_bbox involves the following steps:

determining the number of times hit_num that the top side line l_top passes through a fan-shaped image frame of the binary fan-shaped image fan_seg through the hit_num algorithm;

when the hit_num=2, executing a loop below: a coordinate value y=y−1, and then continuing to determine the number of times hit_num that a new top side line l_top passes through the fan-shaped image frame through the hit_num algorithm; when the hit_num is 0 or the y is 0, exiting the loop;

when the hit_num=0, executing a loop below: a coordinate value y=y+1, and then continuing to determine the number of times hit_num that a new top side line l_top passes through the fan-shaped image frame through the hit_num algorithm; when the number of times that a new top side line l_top passes through the fan-shaped image frame is 1, executing y=y−1, and exiting the loop, where a latest top side line l_top after adjustment is the top side line of the minimum bounding rectangle of the fan-shaped image frame;

adjusting the bottom side line l_bottom of the rectangular detection box fan_bbox involves the following steps:

determining the number of times hit_num that the bottom side line l_bottom passes through a fan-shaped image frame of the binary fan-shaped image fan_seg through the hit_num algorithm;

when the hit_num>2, executing a loop below: a coordinate value y=y+1, and then continuing to determine the number of times hit_num that a new bottom side line l_bottom passes through the fan-shaped image frame through the hit_num algorithm; when the hit_num is 0 or the y is an image height, exiting the loop; and when the hit_num=0, executing a loop below: a coordinate value y=y−1, and then continuing to determine the number of times hit_num that a new bottom side line l_bottom passes through the fan-shaped image frame through the hit_num algorithm; when the number of times that a new bottom side line l_bottom passes through the fan-shaped image frame>1, executing y=y+1, and exiting the loop, where a latest bottom side line l_bottom after adjustment is the bottom side line of the minimum bounding rectangle of the fan-shaped image frame.

In a preferred embodiment, the S50 includes the following sub-steps:

S51: importing a size of a target paper cup model required for production, and a graphic design template with a fan-shaped image frame;

S52: clearing any other content from the graphic design template, and leaving only the clean fan-shaped image frame;

S53: cropping according to the minimum bounding rectangle of the fan-shaped image frame to obtain a final template image tmpl_image of the target paper cup model;

S54: acquiring precise fan-shaped image specification data according to the template image tmpl_image; the fan-shaped image specification data includes: a left side line, a right side line, an angle between the two side lines, lengths of the two side lines, an upper arc vertex, a lower arc vertex, a center and a radius of a concentric circle in a printing area, and a side line of bleed;

S55: based on the template image tmpl_image, creating a fan-shaped image frame and a precise binary mask tmpl_mask where values of all pixels in an internal area are 255, and values of all pixels in all other areas are 0;

S56: saving corresponding parameters of the template image tmpl_image in a database;

S57: saving the fan-shaped image specification data of the target paper cup model and the precise binary mask tmpl_mask in the database; and S58: cyclically executing the S51-S57 until data of all paper cup models is entered, and a model list is generated.

In a preferred embodiment, the S60 includes the following sub-steps:

S61: importing the binary image bin_image, the binary mask fan_mask, and the dilated_mask; and S62: performing the bitwise AND operation between the rough contour fan_contour=mask_contour of the fan-shaped image and the bin_image, where mask_contour=dilated_mask−fan_mask obtained after morphological erosion.

In a preferred embodiment, the S70 includes the following sub-steps:

S71: executing line search on the rough contour fan_contour of the fan-shaped image, and adding straight lines or line segments with a slope k>0 to a right side line list r_line_list;

S72: traversing the right side line list r_line_list, merging line segments on a same line into a longer line segment, removing original line segments from the right side line list r_line_list and adding newly merged line segments, to obtain a new r_line_list with less line segments; and S73: using a preset matching algorithm to find out a line segment r_line' from the right side line list r_line_list of the rough contour fan_contour of the fan-shaped image, where the fan-shaped r_line' and a right side line of a fan-shaped image frame of the target paper cup model cup_type are most approximate to a same straight line.

In a preferred embodiment, the matching algorithm includes the following steps:

S731: setting a threshold epsilon for an absolute slope difference between two lines, and setting an initial minimum value of the absolute slope difference as abs_k_min=−1;

S732: executing a loop below from the model list: obtaining a line segment line1 from the right side line list r_line_list and obtaining a slope k1;

traversing a paper cup model type_i from the model list, obtaining a right side line line2 corresponding to a fan-shaped image frame of the paper cup model type_i, and obtaining a slope k2;

calculating an absolute value |k1−k2| of a slope difference between the line1 and the line2;

when the abs_k_min<|k1−k2|, overriding an initial assignment value and setting abs_k_min=|k1−k2|, cup_type=type_i, and r_line'=line1, and executing S733; and S733: when the abs_k_min<epsilon, returning the line segment r_line' and the target paper cup model cup_type; otherwise, when there is no corresponding paper cup model, exiting the current matching loop.

The present disclosure, in a second aspect, provides a device for precisely obtaining a fan-shaped image frame of a paper cup. The device includes:

a rough rectangle acquisition module, configured for detecting an imported image to be processed through a pre-trained fan-shaped image detection model, and outputting a rectangular fan-shaped image detection box, which is denoted as fan_bbox;

a rough fan-shaped image segmentation module, configured for performing fan-shaped image segmentation on the imported image to be processed through a pre-trained fan-shaped image segmentation model, and outputting a binary mask of the fan-shaped image, which is denoted as fan_mask;

a binary fan-shaped image acquisition module, configured for binarizing the image to be processed to obtain a binary image denoted as bin_image, and segmenting the binary image bin_image according to the binary mask fan_mask to obtain a binary fan-shaped image denoted as fan_seg;

a bounding rectangle adjustment module, configured for determining a number of times that a side line of the rectangular detection box fan_bbox passes through a frame communication area of the binary fan-shaped image fan_seg through a preset hit_num algorithm, and adjusting a side line position of the rectangular detection box fan_bbox according to the number of times, to obtain a minimum bounding rectangle of the binary fan-shaped image fan_seg, which is denoted as min_bbox;

a model list acquisition module, configured for obtaining a model list including a template image of each paper cup model, corresponding precise fan-shaped image specification data and a precise binary mask, where the template image is denoted as tmpl_image, and the precise binary mask is denoted as tmpl_mask;

a fan-shaped contour acquisition module, configured for obtaining a rough contour of the fan-shaped image denoted as fan_contour, according to the binary mask fan_mask and the binary image bin_image;

a paper cup model matching module, configured for determining a target paper cup model corresponding to the rough contour fan_contour of the fan-shaped image through a preset algorithm, which is denoted as cup_ type, where determination conditions of the preset algorithm include: when a right side line of the rough contour fan_contour of the fan-shaped image and a right side line of the target paper cup model cup_type are most approximate to a same straight line;

a template parameter importing module, configured for importing a template image tmpl_image of the target paper cup model cup_type, the image to be processed, and the corresponding minimum bounding rectangle min_bbox, and cropping the image to be processed as the minimum bounding rectangle min_bbox to obtain a processing area image roi_image; and a precise fan-shaped image segmentation module, configured for scaling the processing area image roi_image to a same size as the template image tmpl_image, and performing a bitwise AND operation between the precise binary mask tmpl_mask and the processing area image roi_image to obtain a fan-shaped image precisely segmented from the image to be processed and its corresponding frame.

In a third aspect, the present disclosure provides a terminal. The terminal includes a memory, a processor, and a computer program stored in the memory, where when the computer program is executed by the processor, various steps of the method for precisely obtaining a fan-shaped image frame of a paper cup according to any of the above embodiments are implemented.

In a fourth aspect, the present disclosure provides a computer-readable storage medium. A computer program is stored in the computer-readable storage medium, and when the computer program is executed by the processor, various steps of the method for precisely obtaining a fan-shaped image frame of a paper cup according to any of the above embodiments are implemented.

In a fifth aspect, the present disclosure provides a computer program product, and the product includes a computer program or instructions, where when the computer program or the instructions are executed by the processor, various steps of the method for precisely obtaining a fan-shaped image frame of a paper cup according to any of the above embodiments are implemented.

The method and device for precisely obtaining a fan-shaped image frame of a paper cup are provided by the present disclosure. The method includes: first, obtaining a rough bounding rectangle through a fan-shaped image detection model, then obtaining a rough fan-shaped image segmented through a fan-shaped image segmentation model, adjusting a minimum bounding rectangle accordingly based on the rough bounding rectangle segmented, and finally, determining a corresponding paper cup model according to a line of a rough contour of the fan-shaped image, so as to obtain a size and range of a more precise fan-shaped image frame in combination with the minimum bounding rectangle. In each of the steps, a large amount of interference and noise from an original image are eliminated to obtain a final precise frame. The model list containing a fan-shaped image parameter library is a basis for application of the method to practical production, and a method of determining a paper cup model according to a line enables rapid and efficient identification of a model, thus improving processing efficiency.

BRIEF DESCRIPTION OF THE DRAWINGS

To describe the technical solution in the examples of the present disclosure more clearly, the accompanying drawings required for describing the examples are briefly described below. It should be understood that the following accompanying drawings show merely some examples of the present disclosure, and therefore it should not be construed as a limitation to the scope. Those of ordinary skill in the art can also derive other accompanying drawings from these accompanying drawings without making inventive efforts.

DETAILED DESCRIPTIONS OF THE EMBODIMENTS

Figure 1:
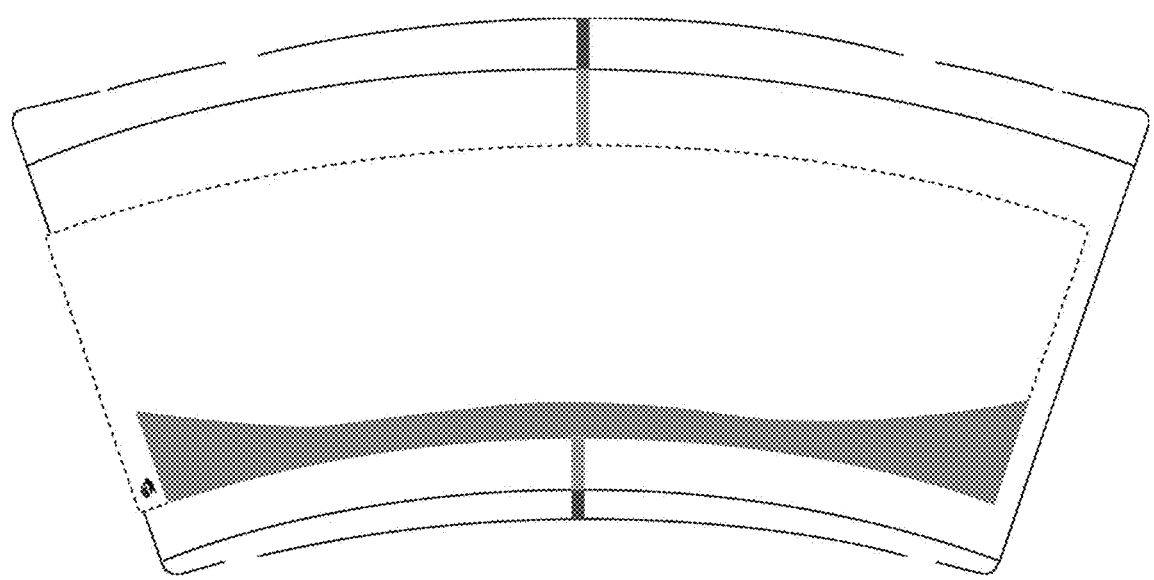
FIG. 1 is an exemplary schematic diagram of a calibrated printing content area.

To make objectives, technical solutions and beneficial technical effects of the present disclosure clearer, the present disclosure will be further described in detail with reference to accompanying drawings and specific embodiments. It should be understood that the specific embodiments described in the present specification are merely illustrative of the present disclosure and are not intended to limit the present disclosure.

It should also be understood that the terms used in the present specification are merely for the purpose of describing specific examples and are not intended to limit the present disclosure. As used in the present specification and the appended claims, the singular terms "a", "an" and "the" are intended to include the plural forms unless clearly indicated otherwise in the context.

It should be further understood that the term "and/or" as used in the present specification and the appended claims refers to and includes any or all possible combinations of one or more of the associated listed items.

Before describing the technical solution of the present disclosure in detail, some specialized terms that may be involved need to be explained first:

(1) Mask/segmentation mask: is a technique in computer vision that is used to precisely separate an object in an image from a background. All pixels are classified and labeled to achieve fine-grained segmentation of image areas. Each pixel is assigned with a label indicating its nature of belonging to a foreground or a background, or a different object category. Such label information forms a two-dimensional bounding rectangle, i.e., a segmentation mask.

Bounding box (Bbox): Bbox is a rectangular box used to enclose surrounding target objects. The rectangular box defines a size, a position and an orientation of a target. Bbox is usually represented by four corners that are commonly referred to as an top-left corner, a top-right corner, a bottom-right corner, and a bottom-left corner. In a computer vision algorithm, Bbox is usually associated with target detection tasks. Object detection is a computer vision task that aims to automatically detect an existence and a location of a target object in an image or a video.

Annotation/data annotation: the data annotation is a key link for effective operation of most artificial intelligence algorithms. In simple terms, the data annotation is a process of processing unprocessed voices, images, text, videos and other data and turning them into machine-recognizable information. Types of the data annotation mainly include image annotation, voice annotation, 3D point cloud annotation, and text annotation. The image annotation is a process of processing and converting unprocessed image data into machine-readable information, and then sending to an artificial intelligence algorithm and model for retrieval. Common image annotation methods include semantic segmentation, rectangular box annotation, polygon annotation, keypoint annotation, point cloud annotation, 3D cube annotation, 2D/3D fusion annotation, target tracking, and the like.

Image segmentation model: is a neural network model that implements semantic segmentation or instance segmentation.

Fine tuning/fine adjustment: refers to large-scale pre-training on general domain data and adaptation to specific tasks or domains.

Fan-shaped image specification data: includes a left side line and a right side line of a fan-shaped image frame of a specific model of paper cup, an angle between the two side lines, lengths of the two side lines, an upper arc vertex, a lower arc vertex, a center and a radius of a concentric circle in a printing area.

Example 1

In an example of the present disclosure, a method for precisely obtaining a fan-shaped image frame of a paper cup is provided. The method is used for fan-shaped image recognition of a paper cup design drawing with a fan-shaped image, and is capable of precisely and automatically annotating a fan-shaped image frame of a paper cup, and automatically generating precise annotation data. The method facilitates subsequent training and fine-tuning of a neural network model, and is used for precisely positioning target areas for printing, die-cutting and texture sampling.

Figure 2:
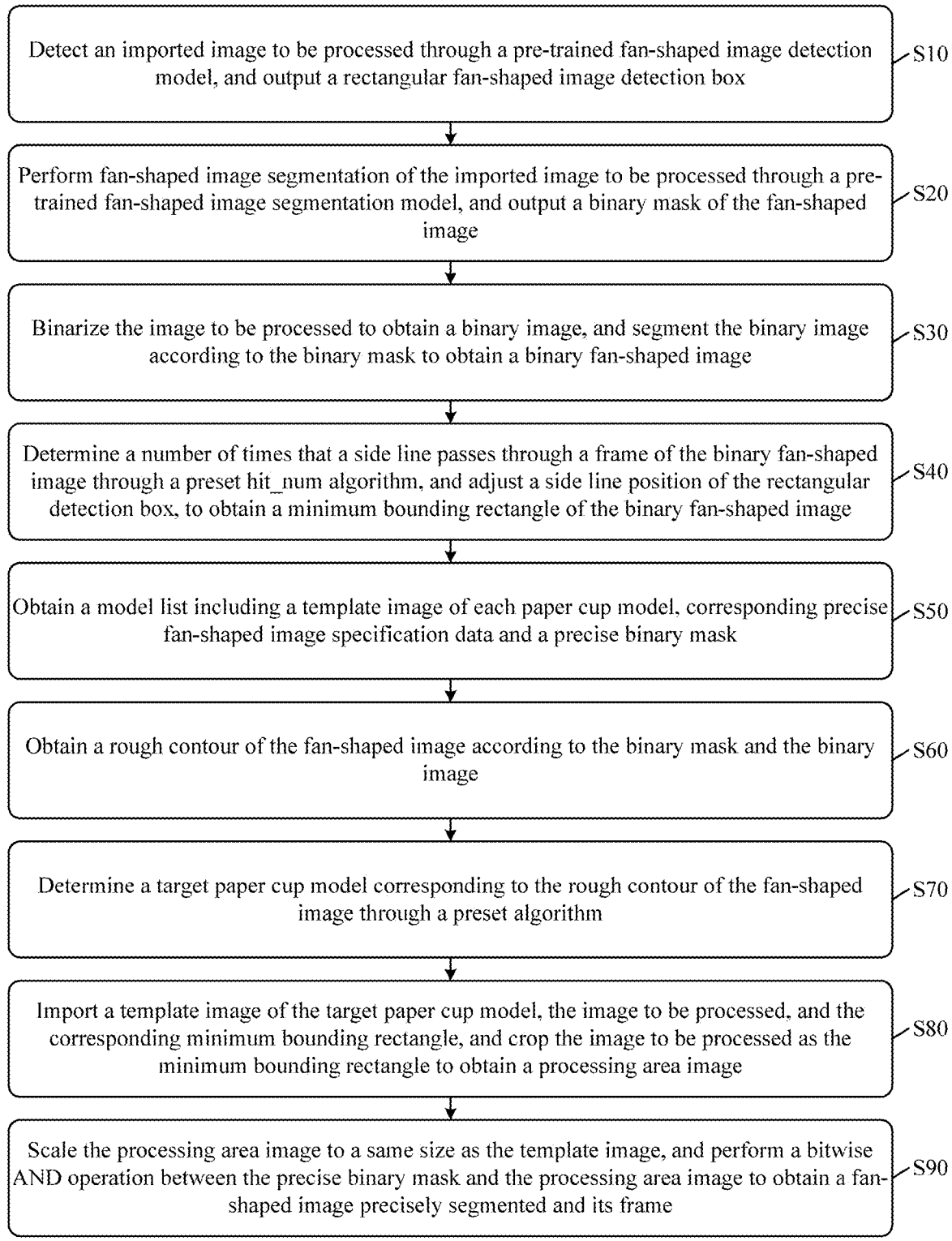
FIG. 2 is a flowchart of a method for precisely obtaining a fan-shaped image frame of a paper cup provided by the present disclosure.

As illustrated in FIG. 2, the method for precisely obtaining a fan-shaped image frame of a paper cup includes S10-S90.

S10: an imported image to be processed is detected through a pre-trained fan-shaped image detection model, and a rectangular fan-shaped image detection box is output, which is denoted as fan_bbox.

S20: fan-shaped image segmentation is performed on the imported image to be processed through a pre-trained fan-shaped image segmentation model, and a binary mask of the fan-shaped image is output, which is denoted as fan_mask.

It should be noted that the above fan-shaped image detection model and the fan-shaped image segmentation model can be implemented based on the prior art, and specific implementation principles and embodiments will not be repeated herein.

S30: the image to be processed is binarized to obtain a binary image denoted as bin_image, and the binary image bin_image is segmented according to the binary mask fan_mask to obtain a binary fan-shaped image denoted as fan_seg.

Specifically, the S30 includes sub-steps S31-S32.

S31: morphological operations are performed on the binary mask fan_mask, including a closing operation and an opening operation in sequence, and dilated_mask=fan_mask after morphological dilation is obtained. The fan_mask after the morphological dilation refers to a binary mask fan_mask obtained after the morphological dilation. After the dilation, a bright area in an image (usually referring to a foreground object or a highlighted part) becomes larger, and a dark area (usually referring to a background or a low-bright part) remains unchanged or gets smaller. Such operation, i.e., the dilation, can be used to connect adjacent image elements, fill small holes, or enlarge a size of an object in the image. Erosion is opposite to the dilation, and makes the bright area in an image become smaller. Through alternate use of the dilation and the erosion, an effect of processing various images can be achieved. For example, the opening operation (the erosion followed by the dilation) and the closing operation (the dilation followed by the erosion) are used to remove noise and separate objects that are in contact with each other.

S32: the bitwise AND operation between the binary mask fan_mask and the binary image bin_image is performed after the morphological operations, to obtain the segmented binary fan-shaped image fan_seg.

S40: a number of times that a side line of the rectangular detection box fan_bbox passes through a frame communication area of the binary fan-shaped image fan_seg is determined through a preset hit_num algorithm, and a side line position of the rectangular detection box fan_bbox is adjusted according to the number of times, to obtain a minimum bounding rectangle of the binary fan-shaped image fan_seg, which is denoted as min_bbox;

That is, top-left and top-right corner points of the binary fan-shaped image fan_seg are continuously approached by a side line of a rough rectangular box previously detected. In this step, the hit_num algorithm includes S41-S42.

S41: the rectangular detection box fan_bbox and the binary fan-shaped image fan_seg are imported, and linear equation parameters based on the side line of the rectangular detection box fan_bbox are input.

S42: starting from a leftmost side or a topmost part of the binary fan-shaped image fan_seg, all pixel points are traversed along a path determined by the input linear equation parameters, when a pixel value of a traversed pixel point is greater than a preset pixel threshold, the number of passing through is incremented by 1, and when a pixel value of a next pixel point traversed is also greater than the pixel threshold, the recorded number of times of passing through remains unchanged.

Further, in the S40, a left side line l_left, a right side line l_right, a top side line l_top, and a bottom side line l_bottom of the rectangular detection box fan_bbox are defined.

(1) Adjusting the left side line l_left of the rectangular detection box fan_bbox involves the following steps:

the number of times hit_num that the left side line l_left passes through a fan-shaped image frame of the binary fan-shaped image fan_seg is determined through the hit_num algorithm;

when the hit_num=2, a loop below is executed: a coordinate value x=x−1, and then the number of times hit_num that a new left side line l_left passes through the fan-shaped image frame is further determined through the hit_num algorithm; when the hit_num is 0 or the x is 0, the loop is exited; and when the hit_num=0, a loop below is executed: a coordinate value x=x+1, and then the number of times hit_num that a new left side line l_left passes through the fan-shaped image frame is further determined through the hit_num algorithm; when the number of times that a new left side line l_left passes through the fan-shaped image frame is 1, x=x−1 is executed, and the loop is exited, where a latest left side line l_left after adjustment is the left side line of the minimum bounding rectangle of the fan-shaped image frame.

(2) Adjusting the right side line l_right of the rectangular detection box fan_bbox involves the following steps:

the number of times hit_num that the right side line l_right passes through a fan-shaped image frame of the binary fan-shaped image fan_seg is determined through the hit_num algorithm;

when the hit_num=2, a loop below is executed: a coordinate value x=x+1, and then the number of times hit_num that a new right side line l_right passes through the fan-shaped image frame is further determined through the hit_num algorithm; when the hit_num is 0 or the x is an image width, the loop is exited; and when the hit_num=0, a loop below is executed: a coordinate value x=x−1, and then the number of times hit_num that a new right side line l_right passes through the fan-shaped image frame is further determined through the hit_num algorithm; when the number of times that a new right side line l_right passes through the fan-shaped image frame is 1, x=x+1 is executed, and the loop is exited, where a latest right side line l_right after adjustment is the right side line of the minimum bounding rectangle of the fan-shaped image frame.

(3) Adjusting the top side line l_top of the rectangular detection box fan_bbox involves the following steps:

the number of times hit_num that the top side line l_top passes through a fan-shaped image frame of the binary fan-shaped image fan_seg is determined through the hit_num algorithm;

when the hit_num=2, a loop below is executed: a coordinate value y=y−1, and then the number of times hit_num that a new top side line l_top passes through the fan-shaped image frame is further determined through the hit_num algorithm; when the hit_num is 0 or the y is 0, the loop is exited; and when the hit_num=0, a loop below is executed: a coordinate value y=y+1, and then the number of times hit_num that a new top side line l_top passes through the fan-shaped image frame is further determined through the hit_num algorithm; when the number of times that a new top side line l_top passes through the fan-shaped image frame is 1, y=y−1 is executed, and the loop is exited, where a latest top side line l_top after adjustment is the top side line of the minimum bounding rectangle of the fan-shaped image frame.

(4) Adjusting the bottom side line l_bottom of the rectangular detection box fan_bbox involves the following steps:

the number of times hit_num that the bottom side line l_bottom passes through a fan-shaped image frame of the binary fan-shaped image fan_seg is determined through the hit_num algorithm;

when the hit_num>2, a loop below is executed: a coordinate value y=y+1, and then the number of times hit_num that a new bottom side line l_bottom passes through the fan-shaped image frame is further determined through the hit_num algorithm; when the hit_num is 0 or the y is an image height, the loop is exited; and when the hit_num=0, a loop below is executed: a coordinate value y=y−1, and then the number of times hit_num that a new bottom side line l_bottom passes through the fan-shaped image frame is further determined through the hit_num algorithm; when the number of times that a new bottom side line l_bottom passes through the fan-shaped image frame>1, y=y+1 is executed, and the loop is exited, where a latest bottom side line l_bottom after adjustment is the bottom side line of the minimum bounding rectangle of the fan-shaped image frame.

Thus, through the above steps, a minimum bounding rectangle of the binary fan-shaped image fan_seg can be obtained, and interference and noise can be effectively removed during processing.

S50: a model list including a template image of each paper cup model, corresponding precise fan-shaped image specification data and a precise binary mask is obtained, where the template image is denoted as tmpl_image, and the precise binary mask is denoted as tmpl_mask.

It should be noted that constructing the model list containing a fan-shaped image parameter library is a basis for application of the method to practical production. That is, precise parameters for each paper cup model are first determined, then a minimum bounding rectangle is obtained by adjusting a rough binary fan-shaped image fan_seg from an original image, and finally a most approximate paper cup model is matched, and a size and range of a more precise fan-shaped image frame can be obtained based on a determined paper cup model.

Specifically, the S50 includes sub-steps S51-S58.

S51: a size of a target paper cup model required for production, and a graphic design template with a fan-shaped image frame are imported.

S52: any other content is cleared from the graphic design template, and only the clean fan-shaped image frame is left.

S53: cropping is performed according to the minimum bounding rectangle of the fan-shaped image frame to obtain a final template image tmpl_image of the target paper cup model. Since the fan-shaped image frame referred to herein is precise, a corresponding minimum bounding rectangle can be obtained through simple prior art, so details are not described herein again.

S54: precise fan-shaped image specification data is acquired according to the template image tmpl_image. The fan-shaped image specification data includes: a left side line, a right side line, an angle between the two side lines, lengths of the two side lines, an upper arc vertex, a lower arc vertex, a center and a radius of a concentric circle in a printing area, a side line of bleed, and the like.

S55: based on the template image tmpl_image, a fan-shaped image frame and a precise binary mask tmpl_mask where values of all pixels in an internal area are 255 and values of all pixels in all other areas are 0 are created.

S56: corresponding parameters of the template image tmpl_image are saved in a database.

S57: the fan-shaped image specification data of the target paper cup model and the precise binary mask tmpl_mask are saved in the database.

S58: the S51-S57 are cyclically executed until data of all paper cup models is entered, and a model list is generated. Therefore, the model list contains relevant parameters of all paper cup models.

S60: a rough contour of the fan-shaped image denoted as fan_contour is obtained according to the binary mask fan_mask and the binary image bin_image.

Specifically, the S60 includes sub-steps S61-S62.

S61: the binary image bin_image, the binary mask fan_mask, and the dilated_mask obtained in the S31 are imported.

S62: the bitwise AND operation is performed between the rough contour fan_contour=mask_contour of the fan-shaped image and the bin_image, where mask_contour=dilated_mask−fan_mask obtained after morphological erosion. The fan_mask obtained after the morphological erosion refers to a binary mask fan_mask obtained after the morphological erosion.

S70: a target paper cup model corresponding to the rough contour fan_contour of the fan-shaped image is determined through a preset algorithm, which is denoted as cup_type, where determination conditions of the preset algorithm include: when a right side line of the rough contour fan_contour of the fan-shaped image and a right side line of the target paper cup model cup_type are most approximate to a same straight line.

Specifically, the S70 includes sub-steps S71-S72.

S71: line search on the rough contour fan_contour of the fan-shaped image is executed, and straight lines or line segments with a slope k>0 are added to a right side line list r_line_list.

S72: the right side line list r_line_list is traversed, line segments on a same line are merged into a longer line segment, merged line segments are removed from the right side line list r_line_list, and newly merged line segments are added, to obtain a new r_line_list with less line segments.

S73: a preset matching algorithm is used to find out a line segment r_line' from the right side line list r_line_list of the rough contour fan_contour of the fan-shaped image, where the fan-shaped r_line' and a right side line of a fan-shaped image frame of the target paper cup model cup_type are most approximate to a same straight line.

The matching algorithm includes steps S731-S733.

S731: a threshold epsilon ($\varepsilon$) for an absolute slope difference between two lines is set, and an initial minimum value of the absolute slope difference is set as abs_k_min=−1.

S732: a loop below is executed from the model list:
  a line segment line1 is obtained from the right side line list r_line_list, and a slope k1 is obtained;
  a paper cup model type_i from the model list is traversed and obtained, a right side line line2 corresponding to a fan-shaped image frame of the paper cup model type_i is obtained, and a slope k2 is obtained;
  an absolute value |k1−k2| of a slope difference between the line1 and the line2 is calculated; and
  when the abs_k_min<|k1−k2|, an initial assignment value is overridden and abs_k_min=|k1−k2|, cup_type=type_i, and r_line'=line1 are set, and S733 is executed.

S733: when the abs_k_min<epsilon, the line segment r_line' and the target paper cup model cup_type are returned; otherwise, when there is no corresponding paper cup model, the current matching loop is exited.

S80: a template image tmpl_image of the target paper cup model cup_type, the image to be processed, and the corresponding minimum bounding rectangle min_bbox are imported, and the image to be processed is cropped as the minimum bounding rectangle min_bbox to obtain a processing area image roi_image.

S90: the processing area image roi_image is scaled to a same size as the template image tmpl_image, and a bitwise AND operation is performed between the precise binary mask tmpl_mask and the processing area image roi_image to obtain a fan-shaped image precisely segmented from the image to be processed and its corresponding frame.

To sum up, a principle of the above method can be simply summarized as:
(1) first, a rough bounding rectangle is obtained through the fan-shaped image detection model, and a rough fan-shaped image segmented is obtained through a fan-shaped image segmentation model;
(2) a minimum bounding rectangle is adjusted accordingly based on the rough bounding rectangle segmented; and
(3) a corresponding paper cup model is determined according to a line of a rough contour of the fan-shaped image, so as to obtain a size and range of a more precise fan-shaped image frame in combination with the minimum bounding rectangle.

In each of the steps, a large amount of interference and noise from an original image are eliminated to obtain a final precise frame. Therefore, the method of the present disclosure enables to precisely determine a fan-shaped image frame and a model from an image file that features uncertain positions, complex backgrounds and severe noise interference. On this basis, a paper cup model, a minimum bounding rectangle, and a side line corresponding to the precise fan-shaped image frame can be obtained. The present disclosure can be used for precise segmentation of a fan-shaped area, laser die-cutting positioning, printing imposition, 3D rendering sampling, inspection of design problems, and the like.

Figure 3:
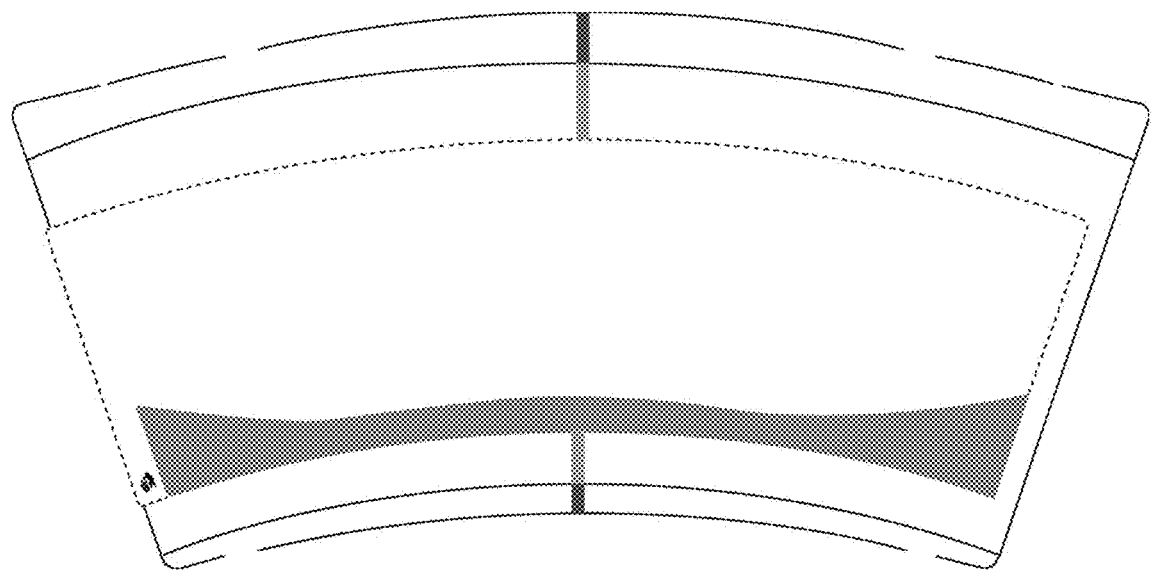
FIG. 3 illustrates an image to be processed in an exemplary example.
Figure 4:
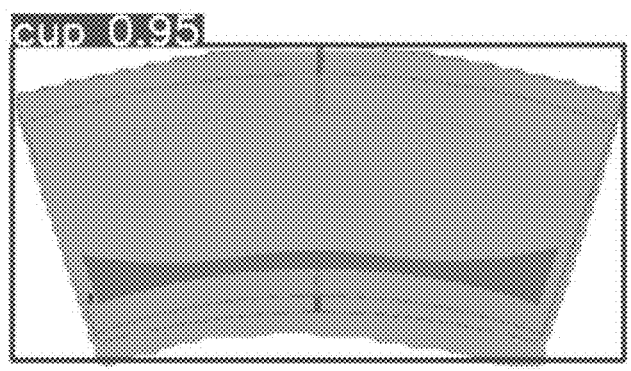
FIG. 4 is a schematic diagram of a rough fan-shaped image and a rough bounding rectangle bbox obtained after model detection and segmentation of the image to be processed shown in FIG. 3.
Figure 5:
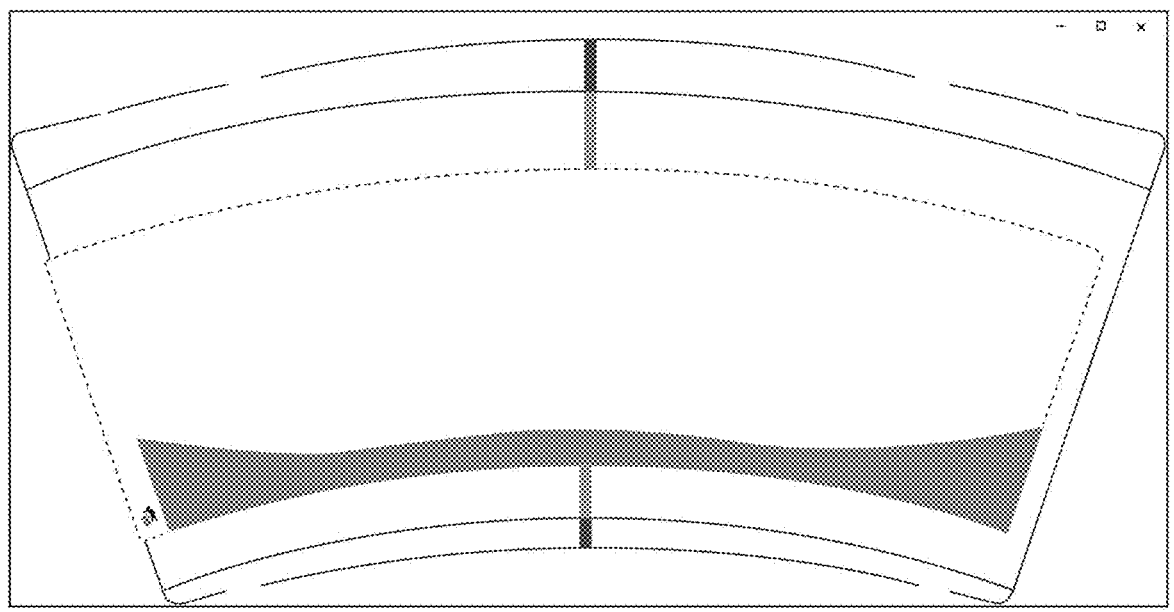
FIG. 5 illustrates a precise fan-shaped image finally obtained after processing an image to be processed through a method of the present disclosure.

In an exemplary example, FIG. 3 illustrates an image to be processed, i.e., an original image containing a lot of noise and interference information; FIG. 4 illustrates a rough fan-shaped image and a rough bounding rectangle bbox obtained after model detection and segmentation of the image to be processed; and FIG. 5 illustrates a precise fan-shaped image finally obtained after processing through the above steps. It should be noted that text in FIGS. 3-5 refers to printing and typesetting prompts in the original image and is not intended to specifically limit the method of the present disclosure.

In a second aspect, the present disclosure provides a device 100 for precisely obtaining a fan-shaped image frame of a paper cup. The device is used for fan-shaped image recognition of a paper cup design drawing with a fan-shaped image, and is capable of precisely and automatically annotating a fan-shaped image frame of a paper cup, and automatically generating precise annotation data. It should be noted that for implementation principles and specific embodiments of the device 100 for precisely obtaining a fan-shaped image frame of a paper cup, reference can be made to the above method for precisely obtaining a fan-shaped image frame of a paper cup, so details are not described herein again.

Figure 6:
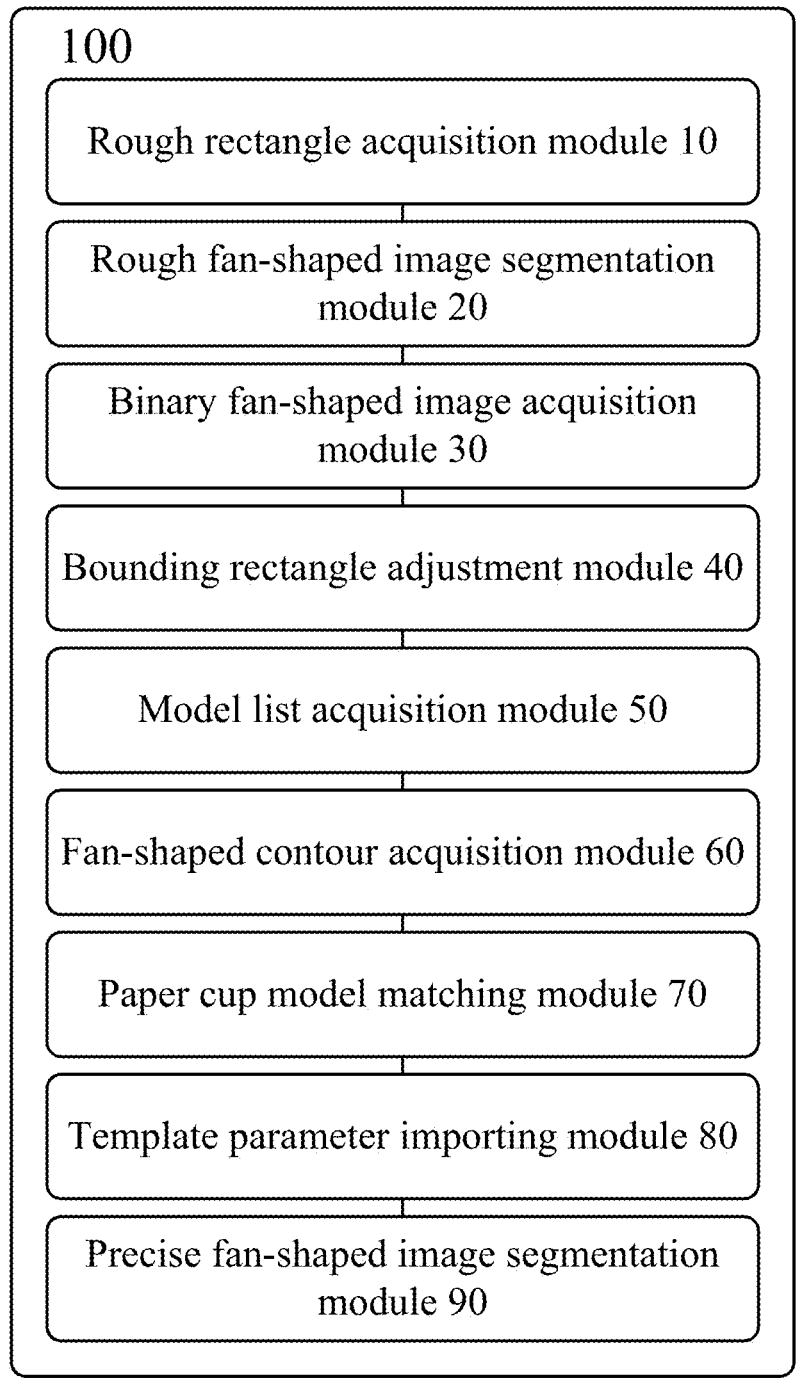
FIG. 6 is a framework diagram of a device for precisely obtaining a fan-shaped image frame of a paper cup provided by the present disclosure.

As illustrated in FIG. 6, the device 100 for precisely obtaining a fan-shaped image frame of a paper cup includes:
  a rough rectangle acquisition module 10, configured for detecting an imported image to be processed through a pre-trained fan-shaped image detection model, and outputting a rectangular fan-shaped image detection box, which is denoted as fan_bbox;
  a rough fan-shaped image segmentation module 20, configured for performing fan-shaped image segmentation of the imported image to be processed through a pre-trained fan-shaped image segmentation model, and outputting a binary mask of the fan-shaped image, which is denoted as fan_mask;
  a binary fan-shaped image acquisition module 30, configured for binarizing the image to be processed to obtain a binary image denoted as bin_image, and segmenting the binary image bin_image according to the binary mask fan_mask to obtain a binary fan-shaped image denoted as fan_seg;

a bounding rectangle adjustment module 40, configured for determining a number of times that a side line of the rectangular detection box fan_bbox passes through a frame communication area of the binary fan-shaped image fan_seg through a preset hit_num algorithm, and adjusting a side line position of the rectangular detection box fan_bbox according to the number of times, to obtain a minimum bounding rectangle of the binary fan-shaped image fan_seg, which is denoted as min_b-box;

a model list acquisition module 50, configured for obtaining a model list including a template image of each paper cup model, corresponding precise fan-shaped image specification data and a precise binary mask, where the template image is denoted as tmpl_image, and the precise binary mask is denoted as tmpl_mask;

a fan-shaped contour acquisition module 60, configured for obtaining a rough contour of the fan-shaped image denoted as fan_contour, according to the binary mask fan_mask and the binary image bin_image;

a paper cup model matching module 70, configured for determining a target paper cup model corresponding to the rough contour fan_contour of the fan-shaped image through a preset algorithm, which is denoted as cup_type, where determination conditions of the preset algorithm include: when a right side line of the rough contour fan_contour of the fan-shaped image and a right side line of the target paper cup model cup_type are most approximate to a same straight line;

a template parameter importing module 80, configured for importing a template image tmpl_image of the target paper cup model cup_type, the image to be processed, and the corresponding minimum bounding rectangle min_bbox, and cropping the image to be processed as the minimum bounding rectangle min_bbox to obtain a processing area image roi_image; and a precise fan-shaped image segmentation module 90, configured for scaling the processing area image roi_image to a same size as the template image tmpl_image, and performing a bitwise AND operation between the precise binary mask tmpl_mask and the processing area image roi_image to obtain a fan-shaped image precisely segmented from the image to be processed and its corresponding frame.

Example 3

The present disclosure provides a terminal. The terminal includes a memory, a processor, and a computer program stored in the memory, where when the computer program is executed by the processor, various steps of the method for precisely obtaining a fan-shaped image frame of a paper cup according to any of the above embodiments are implemented.

Example 4

The present disclosure provides a computer-readable storage medium. A computer program is stored in the computer-readable storage medium, and when the computer program is executed by the processor, various steps of the method for precisely obtaining a fan-shaped image frame of a paper cup according to any of the above embodiments are implemented.

Example 5

The present disclosure provides a computer program product, and the product includes a computer program or instructions, where when the computer program or the instructions are executed by the processor, various steps of the method for precisely obtaining a fan-shaped image frame of a paper cup according to any of the above embodiments are implemented.

To sum up, the method and device for precisely obtaining a fan-shaped image frame of a paper cup are provided by the present disclosure. The method includes: first, obtaining a rough bounding rectangle through a fan-shaped image detection model, then obtaining a rough fan-shaped image segmented through a fan-shaped image segmentation model, adjusting a minimum bounding rectangle accordingly based on the rough bounding rectangle segmented, and finally, determining a corresponding paper cup model according to a line of a rough contour of the fan-shaped image, so as to obtain a size and range of a more precise fan-shaped image frame in combination with the minimum bounding rectangle. In each of the steps, a large amount of interference and noise from an original image are eliminated to obtain a final precise frame. The model list containing a fan-shaped image parameter library is a basis for application of the method to practical production, and a method of determining a paper cup model according to a line enables rapid and efficient identification of a model, thus improving processing efficiency.

Those skilled in the art can clearly understand that for the convenience and brevity of the description, only the division of the above functional units and modules is used for illustration. In practical applications, the above functions can be assigned to different functional units and modules according to needs, that is, the internal structure of the system is divided into different functional units or modules to complete all or part of the functions described above. All functional units and modules in each of the examples of the present disclosure may be integrated into one processing unit, or may be independently and physically present, or two or more units may be integrated into one unit. The above integrated units may be implemented in the form of hardware, or may be implemented in the form of a software functional unit. Furthermore, specific names of all functional units and modules are merely or the convenience of distinguishing each other and are not intended to limit the scope of protection of the present disclosure. For the specific working process of the units and modules in the above system, reference may be made to the corresponding process in the foregoing method embodiments, and details are not described herein again.

In the above examples, each example is described with its own emphasis. For parts that are not described in detail or recorded in a certain example, please refer to the relevant descriptions of other examples.

Those of ordinary skill in the art may appreciate that the units and method steps described in combination with the examples disclosed herein can be implemented through electronic hardware, or a combination of computer software and electronic hardware. Whether these functions are performed in electronic hardware or software depends on the specific application and design constraints of the technical solution. Those skilled in the art can use different methods to implement the described functions for each particular application, but such implementation should not be considered to be beyond the scope of the present disclosure.

In the examples provided by the present disclosure, it should be understood that the disclosed system or device/terminal and method may be implemented in other ways. For example, the examples of the system or device/terminal described above are merely illustrative. For example, division of the modules or units is merely a kind of division of logic functions, there may be other division modes in actual implementation, and for example, a plurality of units or assemblies may be combined or integrated into another system, or some features may be omitted or not executed. Furthermore, shown or discussed coupling or direct coupling or communication connection between each other may be an indirect coupling or communication connection by means of some interfaces, systems or units, and may be in an electrical, mechanical or other form.

The unit described as a separable component may be physically separated or not, and a component shown as a unit may be a physical unit or not, that is, may be located at one place or may also be distributed on a plurality of network units. Part or all of the units may be selected according to actual needs to achieve the objective of the solution of the examples of the present disclosure.

In addition, all functional units in each of the examples of the present disclosure may be integrated into one processing unit, or may be independently and physically present, or two or more units may be integrated into one unit. The above integrated units may be implemented in the form of hardware, or may be implemented in the form of a software functional unit.

The present disclosure is not limited merely to what is described in the specification and the embodiments, such that additional advantages and modifications can be readily achieved by those skilled in the art. Without departing from the spirit and scope of the general concept as defined by the claims and the equivalents, the present disclosure is not limited to the specific details, representative apparatus, and illustrative examples as shown and described herein.

What is claimed is:

1. A method for precisely obtaining a fan-shaped image frame of a paper cup, comprising the following steps:
   S10: importing an image to be processed into a pre-trained fan-shaped image detection model, detecting the imported image to be processed through the pre-trained fan-shaped image detection model, and outputting a rectangular detection box, which is denoted as fan_bbox;
   S20: performing fan-shaped image segmentation of the imported image to be processed through a pre-trained fan-shaped image segmentation model, and outputting a binary mask of a fan-shaped image, which is denoted as fan_mask;
   S30: binarizing the imported image to be processed to obtain a binary image denoted as bin_image, and segmenting the binary image bin_image according to the binary mask fan_mask to obtain a binary fan-shaped image denoted as fan_seg;
   S40: determining a number of times that a side line of the rectangular detection box fan_bbox passes through a frame communication area of the binary fan-shaped image fan_seg through a preset hit_num algorithm, and adjusting a side line position of the rectangular detection box fan_bbox according to the number of times, to obtain a minimum bounding rectangle of the binary fan-shaped image fan_seg, which is denoted as min_bbox;
   S50: obtaining a model list including a template image of each paper cup model, corresponding precise fan-shaped image specification data and a precise binary mask, wherein the template image is denoted as tmpl_image, and the precise binary mask is denoted as tmpl_mask;
   S60: obtaining a rough contour of the fan-shaped image denoted as fan_contour, according to the binary mask fan_mask and the binary image bin_image;
   S70: determining a target paper cup model corresponding to the rough contour fan_contour of the fan-shaped image through a preset algorithm, which is denoted as cup_type, wherein determination conditions of the preset algorithm include: when a right side line of the rough contour fan_contour of the fan-shaped image and a right side line of the target paper cup model cup_type are most approximate to a same straight line;
   S80: importing a template image tmpl_image of the target paper cup model cup_type, the imported_image to be processed, and the corresponding minimum bounding rectangle min_bbox, and cropping the imported image to be processed as the minimum bounding rectangle min_bbox to obtain a processing area image roi_image; and
   S90: scaling the processing area image roi_image to a same size as the template image tmpl_image, and performing a bitwise AND operation between the precise binary mask tmpl_mask and the processing area image roi_image to obtain the fan-shaped image precisely segmented from the imported image to be processed and the fan-shaped image frame corresponding to the fan-shaped image precisely segmented from the imported image to be processed.

2. The method for precisely obtaining a fan-shaped image frame of a paper cup according to claim 1, wherein the S30 comprises the following sub-steps:
   S31: performing morphological operations on the binary mask fan_mask, including a closing operation and an opening operation in sequence, and obtaining dilated_mask=fan_mask after morphological dilation; and
   S32: performing the bitwise AND operation between the binary mask fan_mask and the binary image bin_image after the morphological operations, to obtain the segmented binary fan-shaped image fan_seg.

3. The method for precisely obtaining a fan-shaped image frame of a paper cup according to claim 2, wherein the S60 comprises the following sub-steps:
   S61: importing the binary image bin_image, the binary mask fan_mask, and the dilated_mask; and
   S62: performing the bitwise AND operation between the rough contour fan_contour=mask_contour of the fan-shaped image and the bin_image, wherein mask_contour=dilated_mask_fan_mask obtained after morphological erosion.

4. The method for precisely obtaining a fan-shaped image frame of a paper cup according to claim 3, wherein the S70 comprises the following sub-steps:
   S71: executing line search on the rough contour fan_contour of the fan-shaped image, and adding straight lines or line segments with a slope k>0 to a right side line list r_line_list;
   S72: traversing the right side line list r_line_list, merging line segments on a same line into a longer line segment, removing original line segments from the right side line list r_line_list and adding newly merged line segments, to obtain a new r_line_list with less line segments; and
   S73: using a preset matching algorithm to find out a line segment r_line' from the right side line list r_line_list of the rough contour fan_contour of the fan-shaped image, wherein the fan-shaped r_line' and a right side line of a fan-shaped image frame of the target paper cup model cup_type are most approximate to a same straight line.

5. The method for precisely obtaining a fan-shaped image frame of a paper cup according to claim 4, wherein the matching algorithm comprises the following steps:

S731: setting a threshold epsilon for an absolute slope difference between two lines, and setting an initial minimum value of the absolute slope difference as abs_k_min=−1;

S732: executing a loop below from the model list: obtaining a line segment line1 from the right side line list r_line_list and obtaining a slope k1;

traversing a paper cup model type_i from the model list, obtaining a right side line line2 corresponding to a fan-shaped image frame of the paper cup model type_i, and obtaining a slope k2;

calculating an absolute value |k1−k2| of a slope difference between the line1 and the line2;

when the abs_k_min<|k1−k2|, overriding an initial assignment value and setting abs_k_min=|k1−k2|, cup_type=type_i, and r_line'=line1, and executing S733; and S733: when the abs_k_min<epsilon, returning the line segment r_line' and the target paper cup model cup_type; otherwise, when there is no corresponding paper cup model, exiting the current matching loop.

6. The method for precisely obtaining a fan-shaped image frame of a paper cup according to claim 1, wherein in the S40, the hit_num algorithm comprises the following substeps:

S41: importing the rectangular detection box fan_bbox and the binary fan-shaped image fan_seg, and inputting linear equation parameters based on the side line of the rectangular detection box fan_bbox; and S42: starting from a leftmost side or a topmost part of the binary fan-shaped image fan_seg, traversing all pixel points along a path determined by the input linear equation parameters, when a pixel value of a traversed pixel point is greater than a preset pixel threshold, incrementing the number of passing through by 1, and when a pixel value of a next pixel point traversed is also greater than the pixel threshold, remaining unchanged in the recorded number of times of passing through.

7. The method for precisely obtaining a fan-shaped image frame of a paper cup according to claim 6, wherein in the S40, a left side line l_left, a right side line l_right, a top side line l_top, and a bottom side line l_bottom of the rectangular detection box fan_bbox are defined;

adjusting the left side line l_left of the rectangular detection box fan_bbox involves the following steps:
determining the number of times hit_num that the left side line l_left passes through a fan-shaped image frame of the binary fan-shaped image fan_seg through the hit_num algorithm;
when the hit_num=2, executing a loop below: a coordinate value x=x−1, and then continuing to determine the number of times hit_num that a new left side line l_left passes through the fan-shaped image frame through the hit_num algorithm; when the hit_num is 0 or the x is 0, exiting the loop;
when the hit_num=0, executing a loop below: a coordinate value x=x+1, and then continuing to determine the number of times hit_num that a new left side line l_left passes through the fan-shaped image frame through the hit_num algorithm; when the number of times that a new left side line l_left passes through the fan-shaped image frame is 1, executing x=x−1, and exiting the loop, wherein a latest left side line l_left after adjustment is the left side line of the minimum bounding rectangle of the fan-shaped image frame;

adjusting the right side line l_right of the rectangular detection box fan_bbox involves the following steps:
determining the number of times hit_num that the right side line l_right passes through a fan-shaped image frame of the binary fan-shaped image fan_seg through the hit_num algorithm;
when the hit_num=2, executing a loop below: a coordinate value x=x+1, and then continuing to determine the number of times hit_num that a new right side line l_right passes through the fan-shaped image frame through the hit_num algorithm; when the hit_num is 0 or the x is an image width, exiting the loop;
when the hit_num=0, executing a loop below: a coordinate value x=x−1, and then continuing to determine the number of times hit_num that a new right side line l_right passes through the fan-shaped image frame through the hit_num algorithm; when the number of times that a new right side line l_right passes through the fan-shaped image frame is 1, executing x=x+1, and exiting the loop, wherein a latest right side line l_right after adjustment is the right side line of the minimum bounding rectangle of the fan-shaped image frame;

adjusting the top side line l_top of the rectangular detection box fan_bbox involves the following steps:
determining the number of times hit_num that the top side line l_top passes through a fan-shaped image frame of the binary fan-shaped image fan_seg through the hit_num algorithm;
when the hit_num=2, executing a loop below: a coordinate value y=y−1, and then continuing to determine the number of times hit_num that a new top side line l_top passes through the fan-shaped image frame through the hit_num algorithm; when the hit_num is 0 or the y is 0, exiting the loop;
when the hit_num=0, executing a loop below: a coordinate value y=y+1, and then continuing to determine the number of times hit_num that a new top side line l_top passes through the fan-shaped image frame through the hit_num algorithm; when the number of times that a new top side line l_top passes through the fan-shaped image frame is 1, executing y=y−1, and exiting the loop, where a latest top side line l_top after adjustment is the top side line of the minimum bounding rectangle of the fan-shaped image frame;

adjusting the bottom side line l_bottom of the rectangular detection box fan_bbox involves the following steps:
determining the number of times hit_num that the bottom side line l_bottom passes through a fan-shaped image frame of the binary fan-shaped image fan_seg through the hit_num algorithm;
when the hit_num>2, executing a loop below: a coordinate value y=y+1, and then continuing to determine the number of times hit_num that a new bottom side line l_bottom passes through the fan-shaped image frame through the hit_num algorithm; when the hit_num is 0 or the y is an image height, exiting the loop; and
when the hit_num=0, executing a loop below: a coordinate value y=y−1, and then continuing to determine the number of times hit_num that a new bottom side line l_bottom passes through the fan-shaped image frame through the hit_num algorithm; when the number of times that a new bottom side line l_bottom passes through the fan-shaped image frame>1, executing y=y+1, and exiting the loop, wherein a latest bottom side line l_bottom after adjustment is the bottom side line of the minimum bounding rectangle of the fan-shaped image frame.

8. The method for precisely obtaining a fan-shaped image frame of a paper cup according to claim 1, wherein the S50 comprises the following sub-steps:

S51: importing a size of a target paper cup model required for production, and a graphic design template with a fan-shaped image frame;

S52: clearing any other content from the graphic design template, and leaving only the clean fan-shaped image frame;

S53: cropping according to the minimum bounding rectangle of the fan-shaped image frame to obtain a final template image tmpl_image of the target paper cup model;

S54: acquiring precise fan-shaped image specification data according to the template image tmpl_image; the fan-shaped image specification data includes: a left side line, a right side line, an angle between the two side lines, lengths of the two side lines, an upper arc vertex, a lower arc vertex, a center and a radius of a concentric circle in a printing area, and a side line of bleed;

S55: based on the template image tmpl_image, creating a fan-shaped image frame and a precise binary mask tmpl_mask wherein values of all pixels in an internal area are 255, and values of all pixels in all other areas are 0;

S56: saving corresponding parameters of the template image tmpl_image in a database;

S57: saving the fan-shaped image specification data of the target paper cup model and the precise binary mask tmpl_mask in the database; and S58: cyclically executing the S51-S57 until data of all paper cup models is entered, and a model list is generated.

9. A device for precisely obtaining a fan-shaped image frame of a paper cup, comprising:

a rough rectangle acquisition module, being configured for importing an image to be processed into a pre-trained fan-shaped image detection model, detecting the imported image to be processed through the pre-trained fan-shaped image detection model, and outputting a rectangular detection box, which is denoted as fan_bbox;

a rough fan-shaped image segmentation module, being configured for performing fan-shaped image segmentation of the imported image to be processed through a pre-trained fan-shaped image segmentation model, and outputting a binary mask of a fan-shaped image, which is denoted as fan_mask;

a binary fan-shaped image acquisition module, being configured for binarizing the imported image to be processed to obtain a binary image denoted as bin_image, and segmenting the binary image bin_image according to the binary mask fan_mask to obtain a binary fan-shaped image denoted as fan_seg;

a bounding rectangle adjustment module, being configured for determining a number of times that a side line of the rectangular detection box fan_bbox passes through a frame communication area of the binary fan-shaped image fan_seg through a preset hit_num algorithm, and adjusting a side line position of the rectangular detection box fan_bbox according to the number of times, to obtain a minimum bounding rectangle of the binary fan-shaped image fan_seg, which is denoted as min_bbox;

a model list acquisition module, being configured for obtaining a model list including a template image of each paper cup model, corresponding precise fan-shaped image specification data and a precise binary mask, wherein the template image is denoted as tmpl_image, and the precise binary mask is denoted as tmpl_mask;

a fan-shaped contour acquisition module, being configured for obtaining a rough contour of the fan-shaped image denoted as fan_contour, according to the binary mask fan_mask and the binary image bin_image;

a paper cup model matching module, being configured for determining a target paper cup model corresponding to the rough contour fan_contour of the fan-shaped image through a preset algorithm, which is denoted as cup_type, where determination conditions of the preset algorithm include: when a right side line of the rough contour fan_contour of the fan-shaped image and a right side line of the target paper cup model cup_type are most approximate to a same straight line;

a template parameter importing module, being configured for importing a template image tmpl_image of the target paper cup model cup_type, the imported image to be processed, and the corresponding minimum bounding rectangle min_bbox, and cropping the imported image to be processed as the minimum bounding rectangle min_bbox to obtain a processing area image roi_image; and a precise fan-shaped image segmentation module, being configured for scaling the processing area image roi_image to a same size as the template image tmpl_image, and performing a bitwise AND operation between the precise binary mask tmpl_mask and the processing area image roi_image to obtain the fan-shaped image precisely segmented from the imported image to be processed and the fan-shaped image frame corresponding to the fan-shaped image precisely segmented from the imported image to be processed.

* * * * *